United States Patent
Sin et al.

(10) Patent No.: US 12,187,167 B2
(45) Date of Patent: Jan. 7, 2025

(54) POWER SEAT INTEGRATED CONTROL METHOD

(71) Applicant: DAS CO., LTD, Gyeongju-si (KR)

(72) Inventors: Lee Kwang Sin, Hwaseong-si (KR); Lim Jeong Hyun, Suwon-si (KR)

(73) Assignee: DAS CO., LTD., Gyeongju-si (KR)

( * ) Notice: Subject to any disclaimer, the term of this patent is extended or adjusted under 35 U.S.C. 154(b) by 273 days.

(21) Appl. No.: 17/839,624

(22) Filed: Jun. 14, 2022

(65) Prior Publication Data
US 2022/0396178 A1 Dec. 15, 2022

(30) Foreign Application Priority Data
Jun. 14, 2021 (KR) .......................... 10-2021-0076663

(51) Int. Cl.
*B60N 2/02* (2006.01)
*H02P 29/024* (2016.01)

(52) U.S. Cl.
CPC ....... *B60N 2/0244* (2013.01); *B60N 2/02246* (2023.08); *H02P 29/027* (2013.01); *B60N 2/02253* (2023.08)

(58) Field of Classification Search
CPC .............. B60N 2/0244; B60N 2/02246; B60N 2/02253; B60N 2/0252; H02P 29/027; B60R 16/0231

(Continued)

(56) References Cited

U.S. PATENT DOCUMENTS 6,420,799 B1 * 7/2002 Sakamoto ................. H02J 1/06
370/425
7,800,332 B2 * 9/2010 Whinnery ............... E05F 15/40
318/470

(Continued)

FOREIGN PATENT DOCUMENTS

| JP | 2020-055503 A | 4/2020 |
| KR | 1020030060579 A | 7/2003 |
| KR | 1020170053482 A | 5/2017 |

OTHER PUBLICATIONS

CliveL; Electric seat calibration—a brief guide; Apr. 23, 2019; bimmerpost.com; pp. 1-7.*

(Continued)

*Primary Examiner* — Andrew R Dyer
(74) *Attorney, Agent, or Firm* — Tarolli, Sundheim, Covell & Tummino LLP

(57) ABSTRACT

The present disclosure relates to a power seat integrated control method. One embodiment of the present disclosure includes: a signal input step of receiving a power seat operation signal input that a user inputs through an interface of a vehicle; a determination step of determining an operating condition for operating a motor module that is built into the power seat and moves a specific area of the power seat; and an information transmission step of transmitting driving information for controlling the motor module in accordance with a type of the operation signal. The motor module includes a driving motor and a motor controller which controls the driving motor, and one LIN communication bus is provided between the integrated controller and each power seat. In the information transmission step, the integrated controller transmits the driving information to the motor controller through the LIN communication bus.

5 Claims, 10 Drawing Sheets

(58) Field of Classification Search
USPC .......................................................... 701/49
See application file for complete search history.

(56) References Cited

U.S. PATENT DOCUMENTS

| | | | |
|---|---|---|---|
| 7,933,703 B2* | 4/2011 | Noro | B60R 16/0207 |
| | | | 701/49 |
| 10,245,976 B2* | 4/2019 | Hotary | B60N 2/0228 |
| 2015/0025499 A1* | 1/2015 | Trock | A61M 5/16831 |
| | | | 604/152 |
| 2015/0291102 A1* | 10/2015 | Smith | B60R 3/02 |
| | | | 701/49 |
| 2017/0174102 A1* | 6/2017 | Lee | B60N 2/22 |
| 2019/0123667 A1* | 4/2019 | Lee | H02P 8/32 |
| 2019/0242151 A1* | 8/2019 | Gharabegian | H02K 11/0094 |
| 2023/0135176 A1* | 5/2023 | Yang | B60N 2/56 |
| | | | 701/36 |
| 2023/0311718 A1* | 10/2023 | Svitak | B60N 2/002 |
| | | | 701/49 |

OTHER PUBLICATIONS

Integrate, Apr. 11, 2020, merriam-webster.com, pp. 1-7.*
Danny Jost, What is a Hall Effect Sensor?, Oct. 8, 2019, fierceelectronics.com, pp. 1-2.*
Chinese Office Action for CN application No. 202210669433.0, dated Jul. 31, 2024, 8 pages.

* cited by examiner

POWER SEAT INTEGRATED CONTROL METHOD

CROSS-REFERENCE TO RELATED APPLICATIONS

The present application claims priority to Korean Patent Application No. 10-2021-0076663, filed Jun. 14, 2021, the entire contents of which is incorporated herein for all purposes by this reference.

BACKGROUND

Field

The present disclosure relates to a power seat integrated control method and more particularly to a method for controlling a power seat by using one integrated controller capable of controlling all the power seats without a higher-level controller for each power seat.

Description of the Related Art

A vehicle is provided with various equipment for convenience of which the main purpose is to improve the convenience of a driver or a passenger. An example thereof is a power seat. In general, the seat of a vehicle includes a seatback that supports the back of the passenger, a seat cushion, a headrest, a leg rest, etc., which are intended to seat the passenger. The power seat is referred to as a seat equipped with a device capable of electrically driving each of such parts of the seat by using a motor.

Here, not only a reclining device mounted at a connection portion between the seatback and the seat cushion but also a relaxation device performing the reclining operation of the seatback and the forward movement and tilting operation of the seat cushion at the same time are applied as a device provided in the power seat in order to change the seat sitting posture of the passenger. Also, seats of some luxury vehicles are equipped with a leg rest device capable of supporting legs of the passenger. In addition, in order to more comfortably support the leg, a leg rest extension device may be further provided which operates in such a manner that not only the leg rest rises in conjunction with the leg rest device but also the length of the leg rest extension is extended toward the front of the seat. In addition to the devices mentioned above, the power seat may further include a device for driving the headrest that supports the head. As such, as the driving device is increasing gradually for the convenience of passengers, the motor providing a driving force increases proportionally.

Conventionally, a higher-level controller disposed outside the motor is separately provided for each seat and is electrically connected to each motor that drives each part of the seat. When the operation intention of the passenger is input through interfaces (button, etc.) of the vehicle, the higher-level controller transmits a signal for controlling each motor in the forward or reverse direction, and then the movement of the seat is controlled.

However, as described above, as the specification is advanced, the number of motors increases, and accordingly, the driving circuit within the higher-level controller also increases. Therefore, there is a problem that the volume of the higher-level controller increases. Accordingly, it is necessary to secure a wide space in which the higher-level controller is arranged for each seat. This is disadvantageous in space utilization.

Also, in the case of the existing method of driving a motor in the higher-level controller, every time the number of motors increases by one, a circuit line for transmitting a signal for driving the motor and a power line for connecting to a Hall sensor must be connected between the higher-level controller and the motor in a DC motor. Therefore, in the case of a wire harness connecting the controller and the motor, four connecting lines are provided for each one increased motor. In the case of a BLDC motor, connection lines of the Hall sensor and three phase power lines, that is, a total of eight connection lines are provided. As a result, there is a big problem of a burden of the increased volume of the wire harness.

Also, in the past, when an interworking operation between seats is required, the interworking operation is performed in such a manner that the higher-level controllers communicate with each other by using a controller area network (CAN) communication bus of the vehicle and the interworking logic is performed. However, in this case, if an error occurs in the CAN communication, there may occur a problem that the interworking operation is not performed properly.

PRIOR ART DOCUMENT

Patent Document (Patent Document 1) Korean Patent No. 10-1619619

SUMMARY

Technical Problem

The purpose of the present disclosure is that an interworking operation between the seats can be normally performed even when an abnormality occurs in the CAN communication bus of a vehicle.

Also, the purpose of the present disclosure is to change specification related to the control of the power seat only by updating an integrated controller disposed outside the power seat without replacing a motor module assembled in combination with a frame of the power seat even when the specifications are needed to be changed.

Technical Solution

One embodiment is a power seat integrated control method which is performed by one integrated controller connected to a plurality of power seats. The power seat integrated control method includes: a signal input step of receiving a power seat operation signal input that a user inputs through an interface of a vehicle; a determination step of determining an operating condition for operating a motor module that is built into the power seat and moves a specific area of the power seat; and an information transmission step of transmitting driving information for controlling the motor module in accordance with a type of the operation signal. The motor module includes a driving motor and a motor controller which controls the driving motor, and one LIN communication bus is provided between the integrated controller and each power seat. In the information transmission step, the integrated controller transmits the driving information to the motor controller through the LIN communication bus.

The determination step includes: a step of determining an external condition related to an operation of the power seat 100; a step of determining a control target driving motor on the basis of the operation signal; and a step of receiving an error state signal of the control target driving motor from the motor controller and determining whether the control target driving motor is driven or not.

The step of determining an external condition determines whether an operating power condition, a starting condition, and a driving condition are all satisfied, determines that the operating power condition is satisfied when the integrated controller satisfies a minimum voltage for operating the power seat, determines that the starting condition is satisfied when both an IGN1 signal and an IGN2 signal of the vehicle are in an on-state or in an off-state or when the IGN1 signal is in an off-state and the IGN2 signal is in an on-state, and determines that the driving condition is satisfied when the vehicle is traveling at a speed less than a predetermined speed.

The step of determining whether the control target driving motor is drivable or not determines that it is impossible to operate the control target driving motor when the error state signal input from the motor controller of the control target driving motor is at least one of a Hall sensor error signal which represents a state where a Hall sensor signal is not input to the motor controller, an interference error signal which represents a state where the driving motor is no longer able to operate due to an interference with an external object while the control target driving motor operates, and an overcurrent error signal which represents a state an overcurrent flows through the control target driving motor, and further determines a possibility of occurrence of physical interference between a power seat not to be controlled and the power seat to be controlled, on the basis of the Hall sensor signals input from the motor controller of the control target driving motor and the motor controller of a driving motor not to be controlled, and thus, determines whether the control target driving motor is drivable or not.

When the operation signal is a manual operation signal for allowing a user to move directly the power seat to a position that the user desires, the information transmission step is to check a driving direction of the power seat input through the interface and transmit driving information corresponding to the driving direction and a manual operation driving speed predetermined in the integrated controller to the motor controller of a control target driving motor. When the operation signal is an automatic operation signal for moving the power seat to a pre-stored target position, the information transmission step is to check driving information corresponding to an automatic operation driving speed predetermined in the integrated controller and a hall count value corresponding to the pre-stored target position and transmit the hall count value and the driving information to the motor controller of the control target driving motor.

When the operation signal is the automatic operation signal for moving the power seat to the pre-stored target position, the information transmission step is to determine from the motor controller of the control target driving motor whether motor calibration which learns a distance that the power seat is able to move to the maximum forward and backward is completed or not.

The power seat integrated control method further includes a step of receiving operation state information of the driving motor from the motor controller before the signal input step. The operation state information includes an error state signal which represents whether the driving motor is drivable or not, a Hall sensor signal which represents current position information of the driving motor, and an operation direction signal which includes information on an immediately preceding operation direction of the driving motor.

Advantageous Effects

According to the present invention, the integrated controller transmits driving information of the motor to a motor controller through a communication bus independent of the main CAN communication bus of the vehicle. Therefore, even if an abnormality occurs in the main CAN communication bus, the interworking operation between the seats can be performed normally.

Also, according to the present invention, the driving information of the driving motor is stored in the integrated controller rather than in the motor controller. As the integrated controller provides the driving information to the motor controller, the motor controller controls the driving motor on the basis of the received driving information. Accordingly, the driving information can be changed by updating only the integrated controller while leaving the motor module which is not easy to replace and update because it is coupled to the frame of the power seat.

Further scope of applicability of the present invention will become apparent from the following detailed description for embodying the present invention. However, since various changes and modifications within the spirit and scope of the present invention can be clearly understood by those skilled in the art, specific embodiments such as embodiments included in the following detailed description for embodying the present invention should be understood as being merely illustrative.

DETAILED DESCRIPTION

Figure 1:
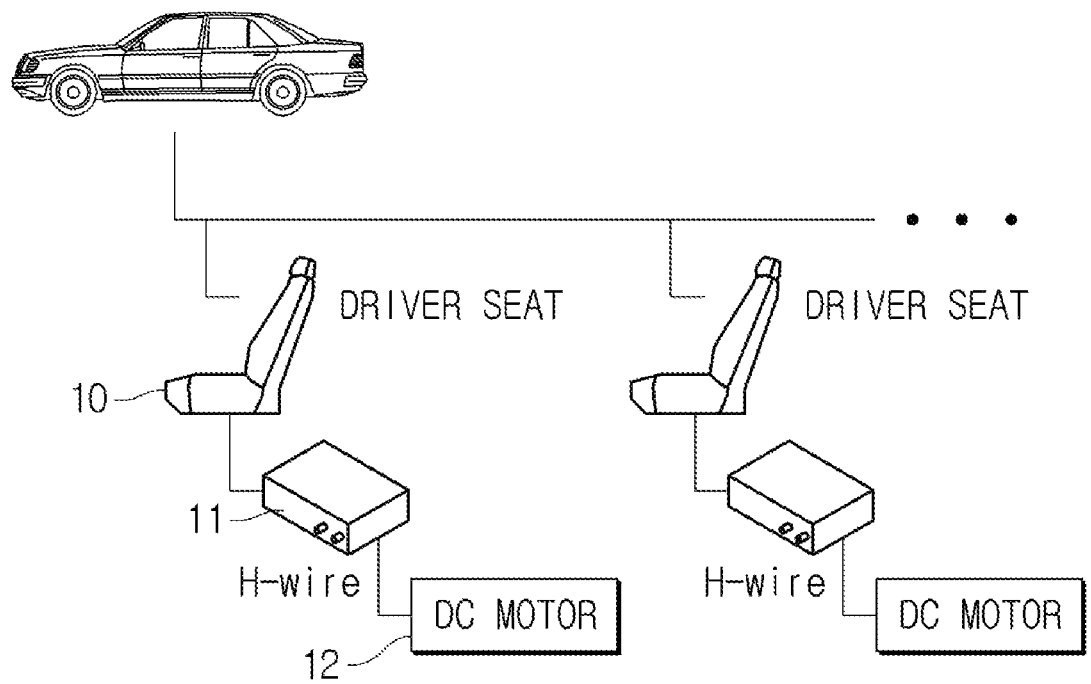
FIG. 1 is a mimetic view of a conventional power seat control system.

Hereinafter, an embodiment of the present disclosure will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

In the description of the present invention, while terms such as the first and the second, etc., can be used to describe various components, the components may not be limited by the terms mentioned above. The terms are used only for distinguishing between one component and other components. For example, the first component may be designated as the second component without departing from the scope of rights of the invention. Similarly, the second component may be designated as the first component.

Similarly, the second component may be designated as the first component. The term of 'and/or' may include a combination or one of a plurality of related items mentioned.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Terms used in the present specification are provided for description of only specific embodiments of the present invention, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Also, the embodiment is provided for giving those skilled in the art more complete description. Therefore, the shapes and sizes and the like of components of the drawings are exaggerated for clarity of the description.

Figure 2:
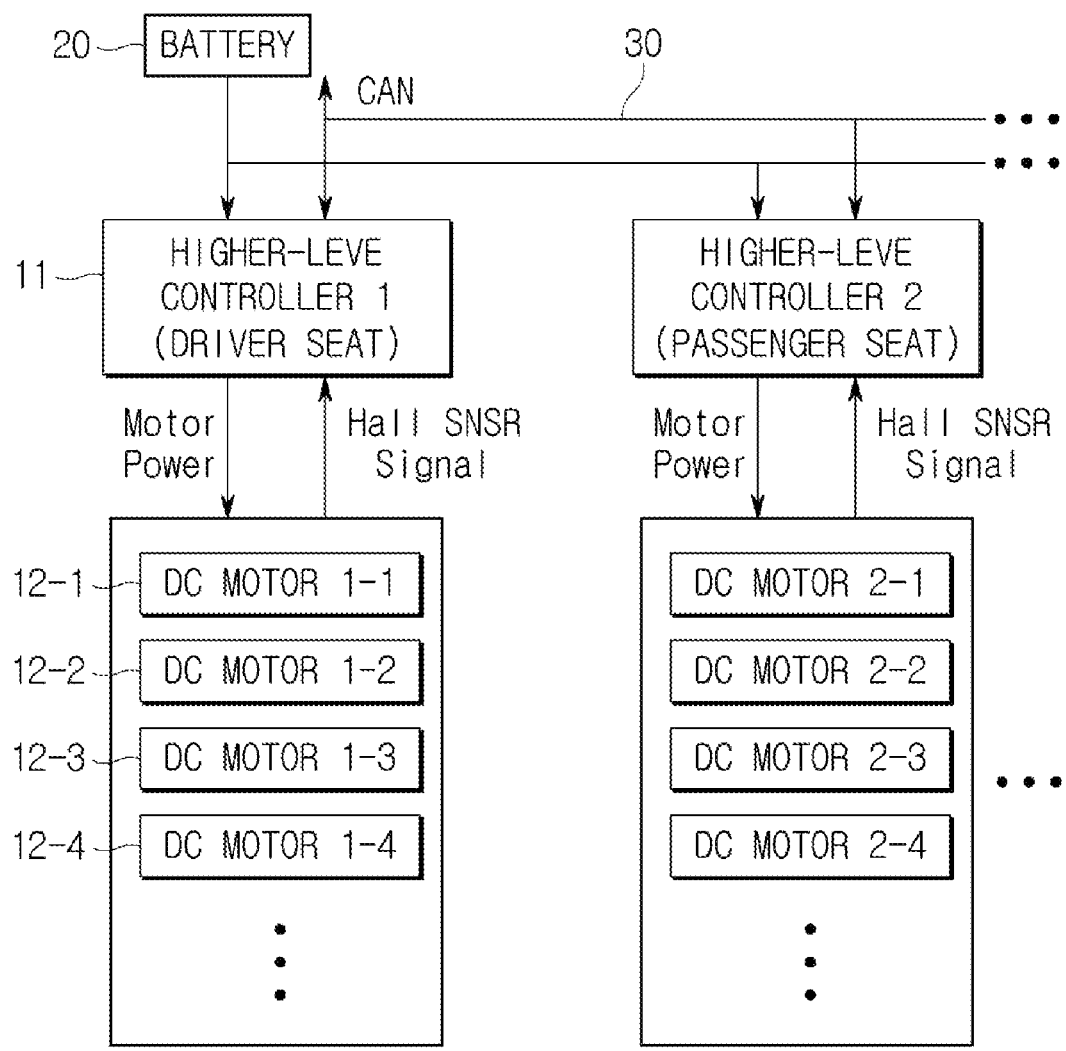
FIG. 2 shows that a higher-level controller of each seat is connected through a main CAN communication bus of a vehicle in the conventional power seat control system.
Figure 3:
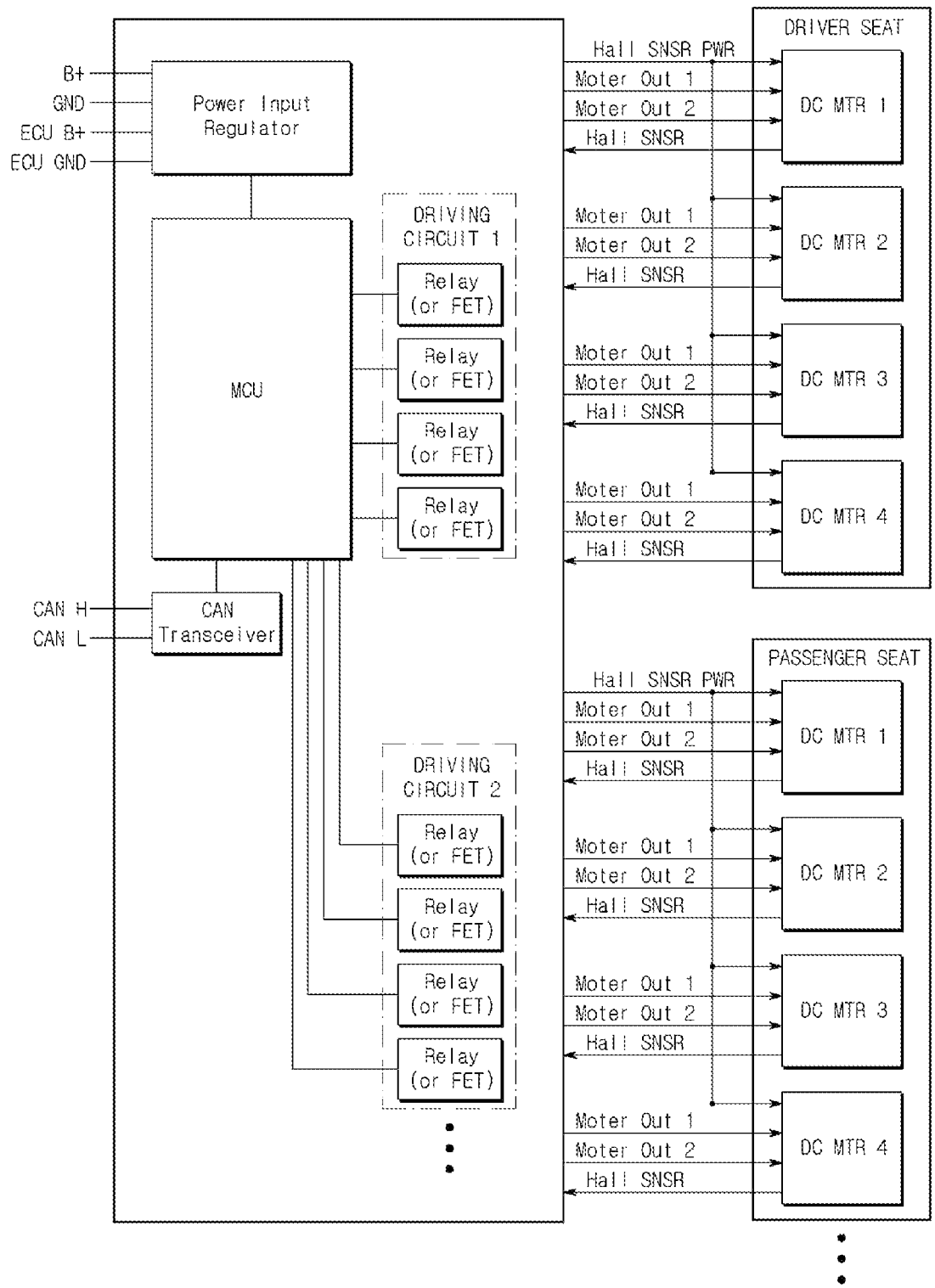
FIG. 3 is a view including an internal block diagram of the higher-level controller disposed for each seat in the conventional power seat control system.

FIGS. 1 to 3 are views for describing a conventional power seat control system. FIG. 1 is a mimetic view of a conventional power seat control system. FIG. 2 shows that a higher-level controller of each seat is connected through a main CAN communication bus of a vehicle in the conventional power seat control system. FIG. 3 is a view including an internal block diagram of the higher-level controller disposed for each seat in the conventional power seat control system.

Referring to FIGS. 1 to 3, in a conventional power seat 10, one higher-level controller 11 is disposed on each power seat 10, and the higher-level controller 11 is connected to a battery 20 of the vehicle. The higher-level controller 11 receives power from the battery 20 and transmits a signal for driving each of DC motors 12-1, 12-2, 12-3, and 12-4 through a driving circuit provided within the higher-level controller 11. Each of DC motors 12-1, 12-2, 12-3, and 12-4 is also connected to driving units (not shown) which are power transmission members for moving each part of the power seat 10.

Here, the driving units may be configured on a frame forming the framework of the power seat 10 and may have various forms. For example, the driving unit for driving a seatback is a reclining device that receives power from the DC motor 12-1. The driving unit is connected to the frame of the seatback and tilts the seatback backward at a certain angle or returns the tilted seatback forward.

Also, for example, the driving unit for driving a seat cushion is a relaxation device that receives power from the DC motor 12-2. The driving unit is connected to the frame of the seat cushion and lifts the seat cushion upward or returns the lifted seat cushion downward. On the other hand, the relaxation device may operate such that only the front side of the seat cushion is lifted upward in consideration of comfortable posture of a passenger.

Also, for example, the driving units for driving a leg rest may be a leg rest device and a leg rest extension device which receive power from the DC motors 12-3 and 12-4, respectively. Each of the devices is connected to a frame of the leg rest and operates together, and lifts the leg rest and simultaneously extends the length of the leg rest forward.

Since it is known that the detailed operation structure of the conventional power seat 10 can be implemented through various types of power transmission members constituting the above-described driving units, a description thereof will be omitted herein.

Meanwhile, as described above, more parts of the power seat 10 may be developed to move in order to induce the passenger to a more comfortable sitting posture. Accordingly, the number of motors included in the power seat 10 may gradually increase.

Between the conventional higher-level controller 11 and one DC motor 12-1, a connection line for forward and reverse driving of the DC motor and a connection line for supplying power to a Hall sensor are required. Accordingly, as the number of DC motors to be connected to the higher-level controller 11 increases by one, the number of connection lines increases by four. If a BLDC motor is used to drive the power seat 10, as the number of BLDC motors to be connected to the higher-level controller 11 increases by one, the connection line increases by a total of eight, that is, three-phase connection lines U, V, and W for driving the BLDC motor and the Hall sensor connection line (two power connection lines, and three signal transmission lines for three phases, respectively).

In addition, the conventional higher-level controller 11 is connected to be able to communicate with each other through a main controller area network (CAN) communication bus 30 of the vehicle. The CAN is a standard communication protocol designed for microcontrollers or devices to communicate with each other without a host computer in the vehicle. Electronic control units (ECUs) within the vehicle communicate by using the CAN protocol. Here, the main CAN communication bus 30 of the vehicle mentioned in this specification may mean that the main CAN communication bus 30 is provided such that the ECU of each part of the vehicle as well as the higher-level controller 11 of the power seat 10 can communicate with each other. In this way, in a situation where the higher-level controllers 11 communicate with each other through the main CAN communication bus 30 of the vehicle and perform an interworking operation, when an abnormality occurs in the main CAN communication bus 30, the interworking operation between the power seats 10 cannot be performed properly (see FIG. 2).

Also, the conventional higher-level controller has a built-in driving circuit for transmitting a driving signal to the DC motors 12-1, 12-2, 12-3, and 12-4. As the number of DC motors to be connected to the higher-level controller 11 increases by one, the driving circuit must also be additionally provided in the higher-level controller 11 in response to the added DC motor (see FIG. 3).

In other words, as the number of motors increases for convenience of the passenger, a problem that the volume of a harness connecting the higher-level controller 11 and the motor increases excessively and a problem that the volume of the higher-level controller 11 itself increases occur.

Hereinafter, an embodiment of the present invention, that is, a power seat integrated control system designed to solve these problems will be described.

Figure 4:
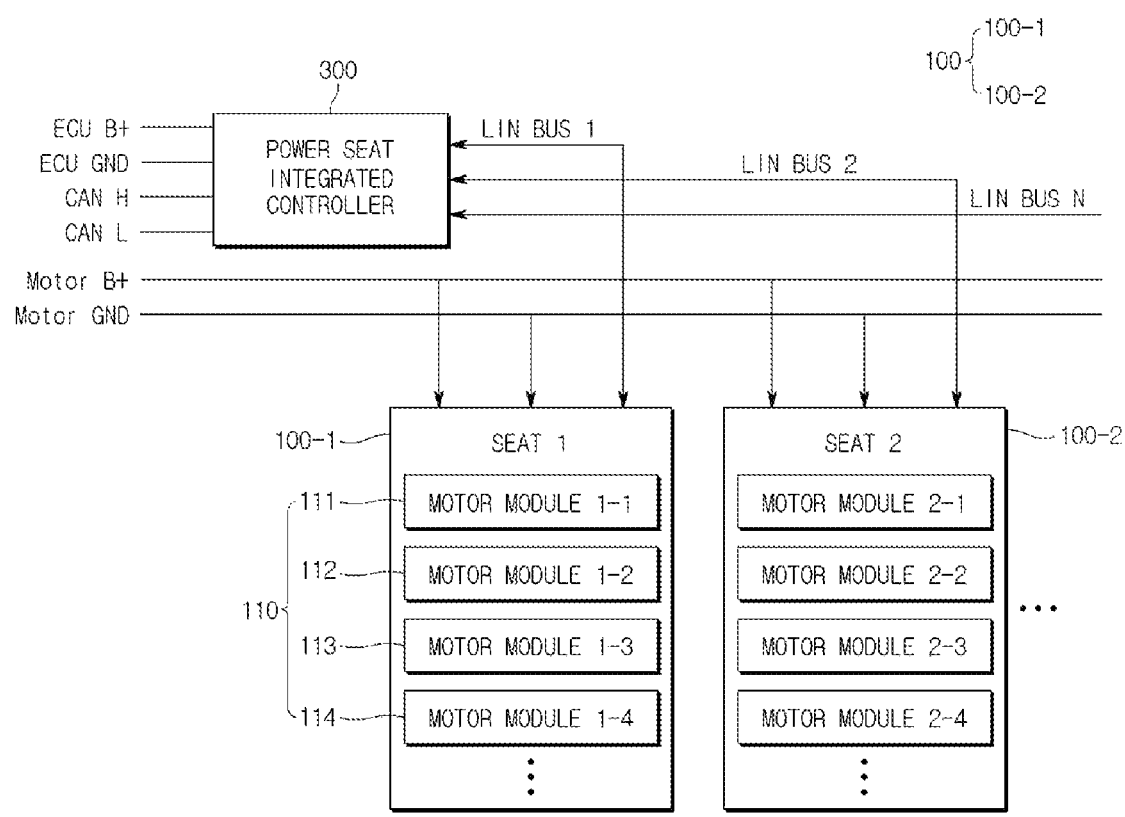
FIG. 4 is a mimetic view of a power seat integrated control system according to an embodiment of the present invention.
Figure 5:
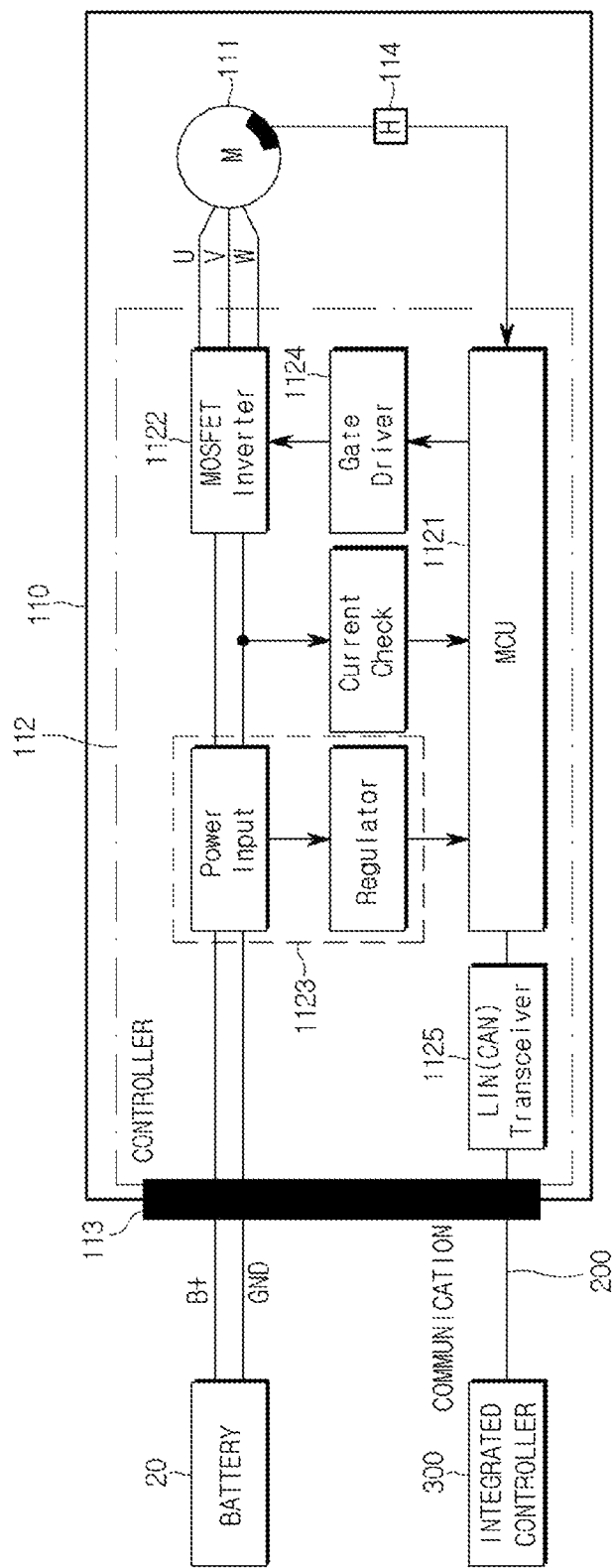
FIG. 5 is a block diagram of a motor controller in the power seat integrated control system according to the embodiment of the present invention.
Figure 6:
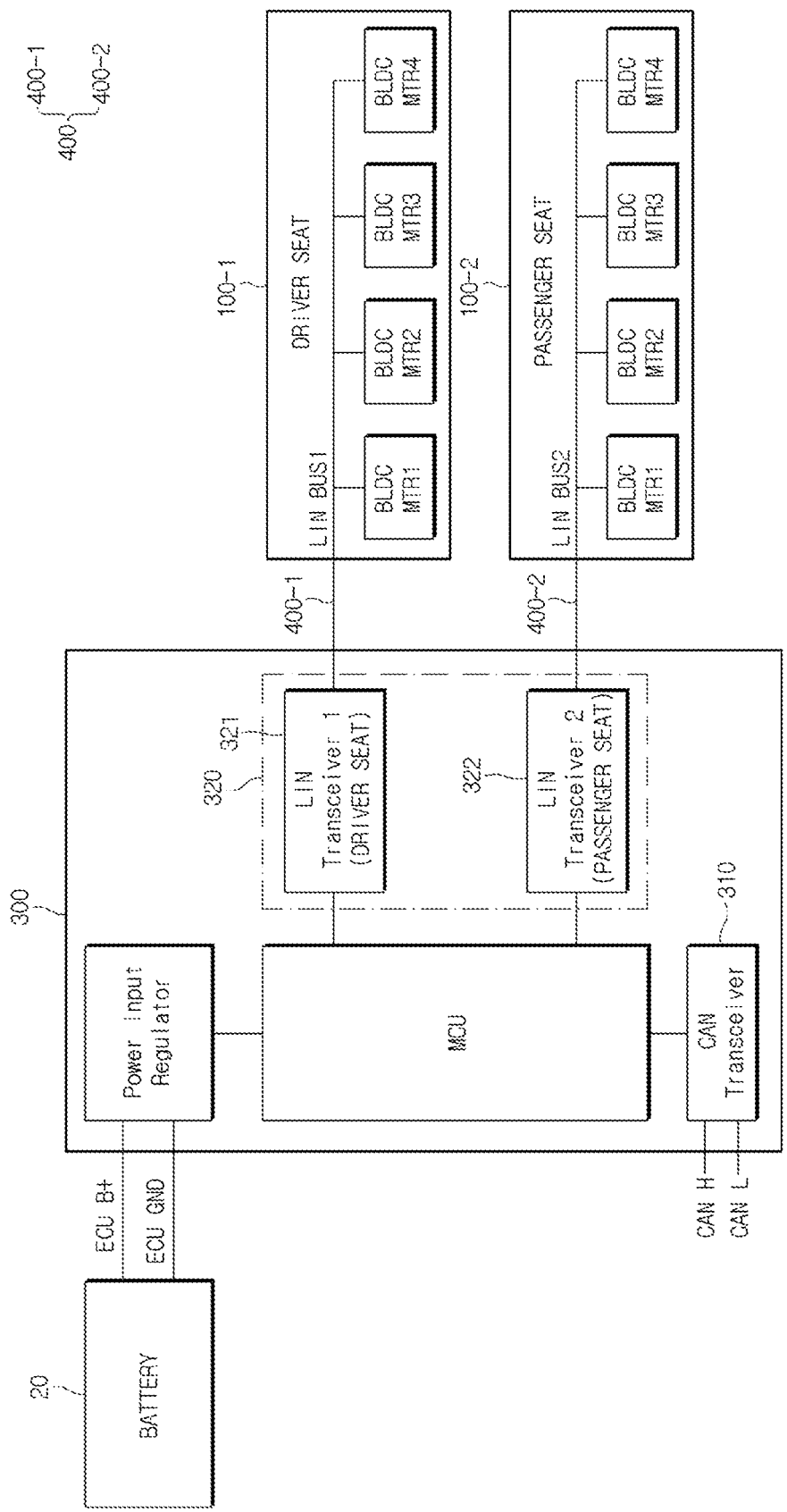
FIG. 6 is a view showing the power seat integrated control system of FIG. 4, which includes an internal block diagram of an integrated controller.

FIG. 4 is a mimetic view of a power seat integrated control system according to an embodiment of the present invention. FIG. 5 is a block diagram of a motor controller in the power seat integrated control system according to the embodiment of the present invention. FIG. 6 is a view showing the power seat integrated control system of FIG. 4, which includes an internal block diagram of an integrated controller.

The power seat integrated control system according to the embodiment of the present invention may include a plurality of power seats 100 disposed in a vehicle, and an integrated controller 300 which integrates and controls the plurality of power seats 100 on the basis of sitting information.

Here, each of the plurality of power seats 100 may include at least one motor module 110 that receives the sitting information from the integrated controller 300 to move a specific area of the power seat 100. More specifically, the motor module 110 is a component which drives each of the above-mentioned reclining device, relaxation device, leg rest device, leg rest extension device, etc. For the driving of the above-described devices, the motor module 110 may include a driving motor 111 and a motor controller 112 that controls the driving motor.

The driving motor 111 may rotate based on a control signal of the motor controller 112 included in the motor module 110. A rotational force generated by the rotation of the driving motor 111 is transmitted to a power transmission unit (not shown) such that each part of the power seat 100 can move. Here, the driving motor 111 may be a brushless DC (BLDC) motor. Most of a motor 12 used in the conventional power seat 10 is a DC motor. When the power seat with the DC motor is used for a long period of time, a brush is abraded by continuous contact between the brush and an electromagnet and thus dust is generated. Also, noise and vibration occur. When the BLDC motor is provided as the driving motor 111 of the motor module 110 according to the embodiment of the present invention, the above-described problems do not occur.

The motor controller 112 is a component for controlling the driving motor 111 and may include a controller 1121 and an inverter 1122. The controller 1121 generates a driving signal for controlling the rotation of the driving motor 111. The inverter 1122 receives the driving signal from the controller 1121 and operates the driving motor 111. Since the motor controller 112 is included in the motor module 110, the role of the driving circuit that is built in a separate housing outside a conventional motor and controls each motor may be integrated into the motor module 110.

A connector 113 may be coupled to the motor controller 112. Here, the connector 113 is a component for connecting the integrated controller 300 that receives a drive command of the power seat and the motor controller 112 built in the motor module 110.

Meanwhile, the motor controller 112 may be composed of a PCB board on which circuit elements constituting the controller 1121, the inverter 1122, etc., to be described later are mounted. The connector 113 may be detachably coupled to the PCB board.

The controller 1121 may transmit the driving signal for the driving motor 111 to a gate driver 1124. The controller 1121 may communicate with the integrated controller 300 through a motor module communication unit 1125 to be described later and may receive information related to the movement of the power seat 100 from the integrated controller 300. The controller 1121 may be composed of a micro control unit (MCU).

The motor controller 112 may further include a power supply unit 1123 directly connected to the battery 20 of the vehicle. The power supply unit 1123 may receive power from the battery 20 and supply the power to the controller 1121. The power supply unit 1123 may be connected to the battery 20 through the connector 113. The power supply unit 1123 may distribute, by using a regulator, the power transmitted from the battery 20, and then may apply the power as operating power to components that require driving power, such as the controller 1121, the gate driver 1124, and a below-described Hall sensor 114, etc. Also, the power supply unit 1123 may supply the power transmitted from the battery 20 to the driving motor 111 through the inverter 1122.

Meanwhile, when the conventional higher-level controller 11 is not integrated with the DC motor 12 and is provided outside the DC motor 12 as a separate component, a connection line for applying power to the Hall sensor is included in the harness between the higher-level controller 11 and the DC motors 12 (see FIG. 3). However, the motor module 110 according to the embodiment of the present invention includes the power supply unit 1123 in the motor controller 112 integrated into the motor module 110, and the power supply unit 1123 is configured to apply the power received from the battery 20 to the Hall sensor 114. Therefore, it is not necessary for the connection line for applying power to the Hall sensor 114 to be present between the integrated controller 300 and the motor module 110. That is, there is an advantage in that the volume of the harness between the integrated controller 300 and the motor module 110 can be reduced.

The inverter 1122 is connected to the gate driver 1124 and the driving motor 111, and may receive the driving signal from the gate driver 1124 and operate the driving motor 111. The inverter 1122 may include a plurality of semiconductor switching elements that are turned on and off in order to convert the DC power of the vehicle battery 20 into alternating current (AC) and to sequentially apply current to each phase of the motor 111. The driving signal from the gate driver 1124 may refer to a switching signal for turning on or off at least one semiconductor switching element among the plurality of semiconductor switching elements.

The motor controller 112 may further include a motor module communication unit 1125 for receiving a command input from the integrated controller 300. Here, the command is driving information related to the control of the driving motor 111 (e.g., rotation direction, rotation speed, etc.) and means information corresponding to sitting information.

The integrated controller 300 and the motor controller 112 within the motor module 110 may be connected only through a communication line 200. The motor module communication unit 1125 may be composed of one or more communication modules so as to receive a command from the integrated controller 300. For example, the communication module may perform a local interconnect network (LIN) communication according to the configuration. Alternatively, for example, the communication module may perform a controller area network (CAN) communication according to the configuration. The motor module communication unit 1125 may be built into the controller 1121.

The motor module 110 according to the embodiment of the present invention may further include the Hall sensor 114. More specifically, the Hall sensor 114 is a component for detecting the rotational position of a rotor. The hall sensor 114 uses a Hall effect that appears in all conductive materials by electric current and magnetic field. When a magnetic field is applied perpendicular to an electric conductor through which the current flows, the Hall sensor 114 may convert a voltage applied perpendicular to the direction of the current and magnetic field into a digital signal and output. The Hall sensor 114 may be composed of a Hall element and an integrated circuit for performing digital signal processing and may receive power from the power supply unit 1123 of the motor controller 112 such that a current can flow through the Hall sensor 114. A signal that is related to the position of the rotor and is output from the hall sensor 114 may be input to the controller 1121. When, on the basis of the signal, the controller 1121 transmits a control signal to the gate driver 1124, the gate driver 1124 may transmit a driving signal for driving the driving motor 111 to the inverter 1122.

The integrated controller 300 is a component that integrates and controls all the power seats 10 disposed in the vehicle. Conventionally, the higher-level controller 11 provided for each power seat 10 no longer needs to exist because, according to the present invention, the motor controller 112 including the driving circuit is integrated with the motor module 110. Accordingly, the integrated controller 300 according to the embodiment of the present invention serves to transmit only a control signal for integrating and controlling the controllers 112 built into the motor module 110.

Here, the integrated controller 300 may include a first communication unit 310 and a second communication unit 320 (refer to FIG. 6). The first communication unit 310 is connected to a controller area network (CAN) communication bus of the vehicle. Here, the CAN communication bus refers to the above-described main CAN communication bus. The CAN communication bus is characterized in that it performs an electrically differentiated communication by using two twisted wires (CAN H and CAN L). The first communication unit 310 may include one or more communication modules for performing CAN communication.

The second communication unit 320 means a transceiver provided to communicate with the motor controller 112. The second communication unit 320 transmits the driving information for operating the driving motor 111 to the motor controller 112 on the basis of the sitting information through a communication bus independent of the main CAN communication bus. The communication bus may be a LIN communication bus or a CAN communication bus. In the embodiment of FIG. 6, a LIN communication bus 400 is shown as an example of the communication bus. The LIN communication bus 400 has a characteristic that it communicates using a single line, and a node connected to the LIN communication bus 400 may be composed of one master and a plurality of slaves.

In this way, as the communication bus connecting the integrated controller 300 and the power seat 100 is configured independently of the CAN bus that is the main communication bus of the vehicle, even if an abnormality occurs in the main communication bus of the vehicle, there is an advantage that the interworking operation between the power seats can be normally performed through a separately provided communication bus.

Meanwhile, one communication bus may be provided between the second communication unit 320 and each power seat 100. Referring to the embodiment of FIG. 6, one LIN communication bus 410 and 420 may be configured between the second communication unit 320 and each power seat 100. For example, the second communication unit 320 and a first seat (driver seat) 100-1 are connected by a first LIN bus 410, the second communication unit 320 and a second seat (passenger seat) 100-2 are connected by a second LIN bus 420, and second communication unit 320 and an N-th seat are connected by an N-th LIN bus. In other words, the second communication unit 320 included in the integrated controller 300 may be provided to correspond to the number of power seats 100 in the vehicle, that is, the number of power seats 100 to be controlled.

In this way, when the communication bus is independently configured for each power seat 100, even if an abnormality occurs in the communication bus of any power seat (driver seat) 100-1, the interworking operation (for example, the interworking operation between the leg rest device and the leg rest extension device of the passenger seat) between the parts of another power seat 100-2 can be normally performed.

The integrated controller 300 integrates and controls all the power seats 100 disposed in the vehicle. In the embodiment of the present invention, it can be understood that the motor controller 112 means a slave controller and integrated controller 300 means a master controller that controls a plurality of slave controllers.

Since the integrated controller 300 does not need to include the driving circuit for driving the driving motor 111, even if the number of driving motors 111 that drive the power seat 100 increases, the volume of the integrated controller 300 does not increase significantly. The integrated controller 300 may receive, through a user interface such as a seat button, etc., the intention of the passenger who moves and operates the power seat 100 and may transmit, through the communication line 200, a digital signal, that is, a control signal, to the motor module 110 to be operated.

Meanwhile, as described above, the motor controller 112 built into the motor module 110 is connected to the integrated controller 300 only by the communication line 200 through the connector 113 (see FIG. 5), and the motor controller 112 is directly connected to the battery 20. That is, a circuit line connected to the battery 20 and the communication line 200 connected to the integrated controller 300 are coupled to the connector 113. According to this structure, the circuit line for supplying power and the communication line 200 for transmitting the control signal do not need to be integrated into one harness. Therefore, when an abnormality occurs in any one part, it is easy to find out where the abnormality occurs and easy to replace it.

Figure 7A:
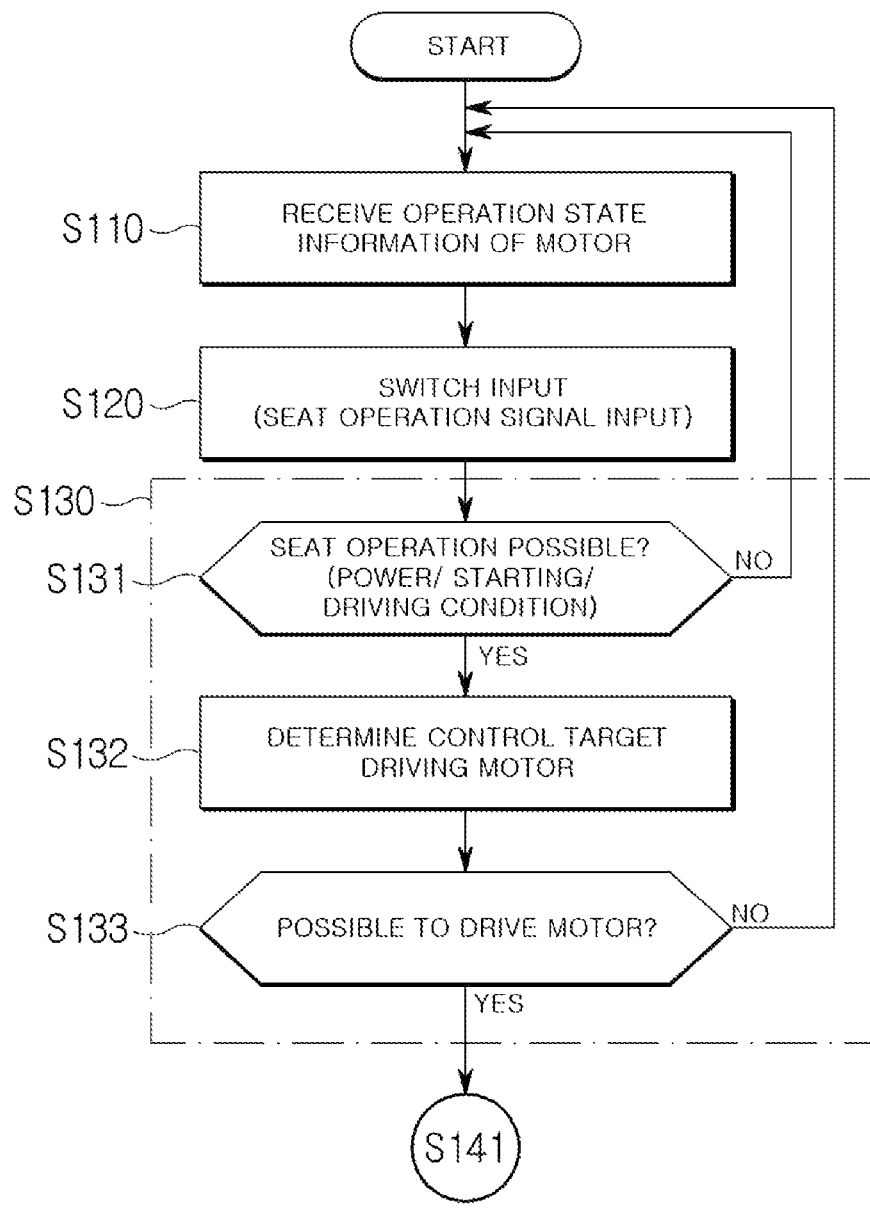
FIG. 7*a* and FIG. 7*b* are flowcharts showing an operation flow of the integrated controller of FIG. 6 in a power seat integrated control method according to the embodiment of the present invention.
Figure 7B:
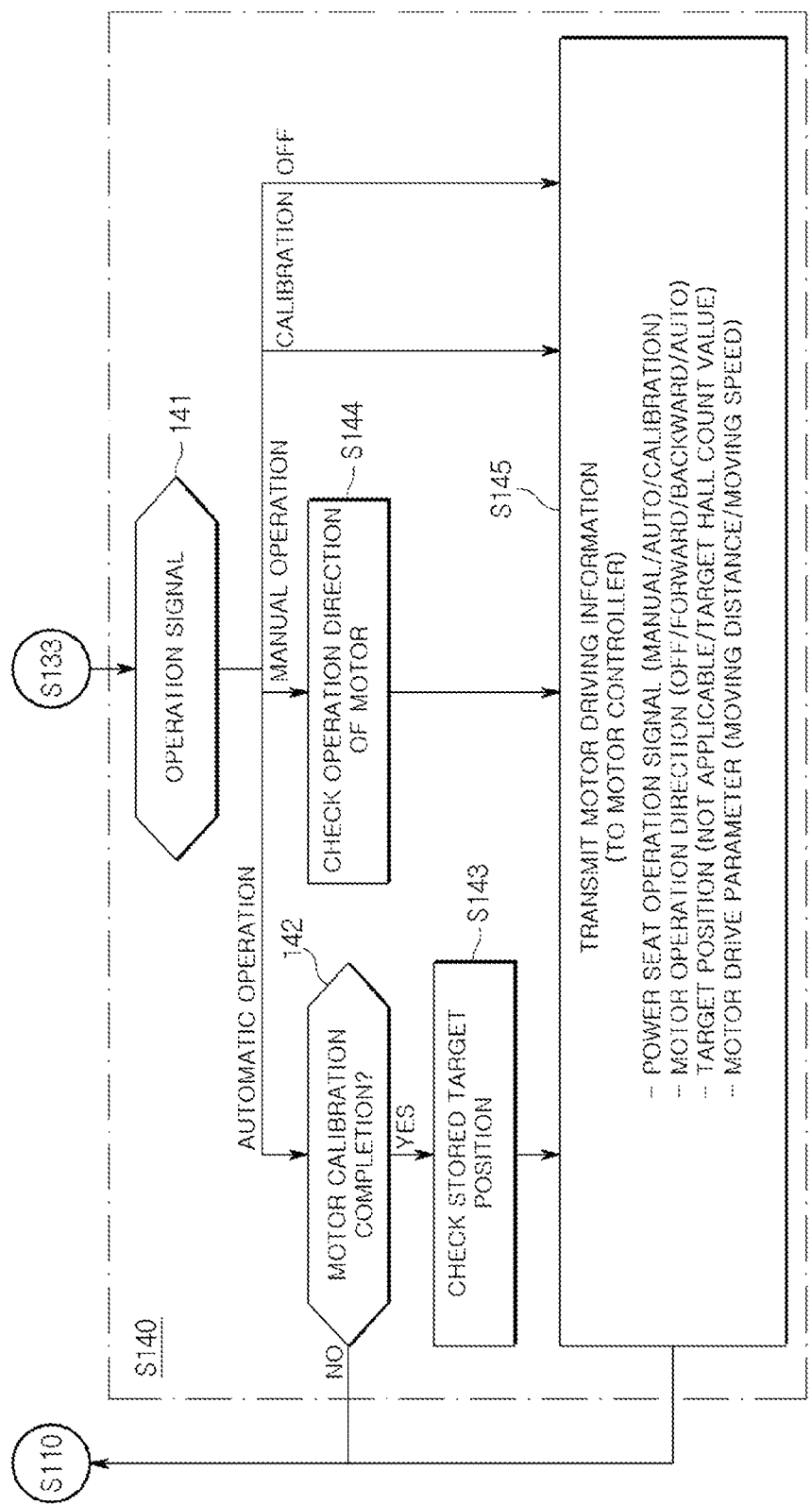

FIG. 7a and FIG. 7b are flowcharts showing an operation flow of the integrated controller of FIG. 6 in a power seat integrated control method according to the embodiment of the present invention.

Referring to FIG. 7a and FIG. 7b, the power seat integrated control method according to the embodiment of the present invention is performed by one integrated controller 300 connected to the plurality of power seats 100. The power seat integrated control method may include a signal input step S120 of receiving a power seat operation signal input that a user inputs through an interface of the vehicle, a determination step S130 of determining an operating condition for operating the motor module 110 that is built into the power seat 100 and moves a specific area of the power seat 100, and an information transmission step S140 of transmitting the driving information for controlling the motor module 110 in accordance with the type of the operation signal.

The method of this embodiment may be performed by the MCU of the integrated controller 300 shown in FIG. 6.

Meanwhile, the plurality of motor modules 110 installed on the power seat 100 includes, as described above, the driving motor 111 and the motor controller 112 for controlling the driving motor 111, respectively, and one LIN communication bus may be provided between the integrated controller 300 and each power seat 100. That is, in the information transmission step, the integrated controller 300 transmits the driving information to the motor controller 112 through the LIN communication bus.

Advantageous effects when one LIN communication bus is provided between the integrated controller 300 and each power seat 100 and information is transmitted through the LIN communication bus has been described above in detail. Thus, repetitive descriptions thereof will be omitted herein.

Hereinafter, the detailed flow of each step will be described in more detail.

First, in the signal input step S120, the interface of the vehicle may mean a series of inputs for driving the power seat, such as a switch of the power seat and/or AVN, etc. The integrated controller 300 is electrically connected to the interface, and the MCU of the integrated controller 300 receives the operation signal for driving the power seat 100 from the interface. The type of the operation signal may be at least one of a turn-off signal, a manual operation signal, an automatic operation signal, and a calibration operation signal.

Here, the manual operation refers to an operation in which the user moves directly the power seat 100 to a position that the user desires. The manual operation means an operation in which while the input from the interface is maintained without a set target position of the power seat 100 the power sheet 100 moves continuously in a direction corresponding to the signal. For example, when an input is received from a direction button such as a forward button, a backward button, etc., the integrated controller 300 may determine that the manual operation signal is input.

Also, when automatic operation refers to an operation in which, when an interface input for moving to a pre-stored position or in a specific mode (such as relaxation, return, or the like) is received, the power seat 100 moves until it reaches a target position corresponding to the pre-stored position or a target position corresponding to the specific mode. For example, the integrated controller 300 may determine that the automatic operation signal is input when an input is received from a memory button in which a specific target position to which the power seat 100 is to move is previously stored.

Meanwhile, the calibration operation refers to an operation in which the power seat 100 learns an operable section of the driving motor 111 in order to identify a section (stroke distance) where the power seat 100 can mechanically move without interference from other parts. The calibration operation can be performed in an initialization step before the power seat 100 is first operated.

Next, the determining step (S130) may include a step of determining an external condition related to the operation of the power seat 100 (S131), a step of determining the control target driving motor 111 on the basis of the operation signal (S132), and a step of receiving an error state signal of the control target driving motor 111 from the motor controller 112 and determining whether the control target driving motor 111 can be driven or not (S133).

Here, the step of determining the external condition (S131) is to determine whether it is no problem to operate the power seat 100 under the external conditions of the power seat 100. That is, the step of determining the external condition is to determine whether an operating power condition, a starting condition, and a driving condition are all satisfied.

The operating power condition is determined by whether the integrated controller 300 satisfies a minimum voltage for operating the power seat 100. When the operation signal is input from the interface of the vehicle, the MCU of the integrated controller 300 may monitor the power applied from the battery and may determine that the operating power condition is satisfied if the voltage is in a predetermined normal range (e.g., 8.5 V to 16.5 V), and may determine that the operating power condition is not satisfied if the voltage is in a range of a low voltage (e.g., 8.5 V or less) or in a range of a high voltage (e.g., 16.5 V or higher) that is out of the normal range. Here, when the operating power condition is determined not to be satisfied, the determination that the operating power condition is not satisfied can also be maintained until a voltage is applied as much as a return voltage (e.g., 10 V or higher if the voltage is determined to be a low voltage and 15 V or less if determined to be a high voltage) rather than the normal range.

The starting condition is determined as follows. The MCU of the integrated controller 300 monitors an IGN1 signal and an IGN2 signal of the vehicle. The MCU may determine that the starting condition is satisfied if both the IGN1 signal and the IGN2 signal are in an on-state or in an off-state or if the IGN1 signal is in an off-state and the IGN2 signal is in an on-state. In the other state, the MCU may determine that the starting condition is not satisfied. The other state means that the IGN1 signal is in an on-state and the IGN2 signal is in an off-state, that is to say, means a state at the moment when the engine of the vehicle is started. Therefore, the MCU determines that the starting condition is not satisfied in consideration of safety and does not allow the power seat 100 to move.

The driving condition is determined as follows. The MCU of the integrated controller 300 monitors an IGN1 power supply unit and the speed of the vehicle. The MCU determines that the driving condition is not satisfied when the speed of the vehicle is greater than or equal to a predetermined speed in the state where the IGN1 is in an on-state. That is, the control of the power seat 100 is prohibited for safety reasons while the vehicle is traveling at a high speed. In other words, if the vehicle is traveling at a speed less than the predetermined speed, the MCU may determine that the driving condition is satisfied.

Meanwhile, only when all external conditions for driving the power seat 100 are satisfied, the next step of determining the control target driving motor 111 is performed (S132). The integrated controller 300 may determine the control target driving motor 111 from among the plurality of driving motors 111 by using the operation signal received through the interface. For example, when the interface is a button, the integrated controller 300 may determine the control target driving motor 111 corresponding to the button on the basis of from which button the operation signal is input.

After the control target driving motor 111 is determined, a step of determining whether the control target driving motor 111 can be currently driven is performed (S133). In this step, it is determined whether the driving motor 111 can operate normally or not. The integrated controller 300 determines whether the control target driving motor 111 can be currently driven, on the basis of the error state signal input from the motor controller 112 of the control target driving motor 111.

The type of the error state signal may include a Hall sensor error signal, an interference error signal, an overcurrent error signal, and a steady-state signal.

The Hall sensor error signal is generated by the motor controller 112 when a Hall sensor input for determining the position of the rotor of the driving motor 111 is not normally input to the motor controller 112. The interference error signal is generated by the motor controller 112 in a state where the driving motor 111 can no longer be operated due to an interference with an external object while the control target driving motor 111 operates. The overcurrent error signal is generated by the motor controller 112 in a state where an overcurrent flows through the control target driving motor 111.

When the MCU of the integrated controller 300 receives at least one of the Hall sensor error signal, the interference error signal, and the overcurrent error signal, the MCU may determine that the control target driving motor 111 is in a state in which it cannot be operated. When the above-described error does not occur, the motor controller 112 generates the steady-state signal and transmits it to the integrated controller 300. When the integrated controller 300 receives the steady-state signal, the integrated controller 300 may determine that the control target driving motor 111 can be driven, and then perform the next step.

In addition, the MCU of the integrated controller 300 further determines a seat interference condition, thereby determining whether the control target driving motor 111 can be driven or not.

A seat interference condition determination is to determine the possibility of occurrence of physical interference between the power seat to be controlled and another power seat not to be controlled, before driving the driving motor 111 of the power seat to be controlled. For example, in a case where the power seat to be controlled is a second-row power seat and the driving motor installed in the second-row power seat to be controlled is a leg rest motor, when a slide motor and a recline motor of the first-row power seat are position beyond a certain point rearward (in a direction of the second-row power seat), it can be expected that interference will occur between the second-row power seat and the first-row power seat when the control target leg rest motor is driven. Here, the MCU of the integrated controller 300 may determine that the seat interference condition is not satisfied and may determine that the control target driving motor 111 is in a state in which it cannot be operated. That is, the MCU of the integrated controller 300 may receive a Hall sensor signal from each motor controller (the motor controller of the control target driving motor and the motor controller of a driving motor not to be controlled) of all the driving motors, may determine current positions of all the driving motors by using the Hall sensor signal, and may predict and determine whether interference with other power seats will occur when the driving motor 111 of the power seat to be controlled is driven. To this end, the integrated controller 300 may store in advance information on conditional relationships between the positions of the respective driving motors for preventing the interference.

When the control target driving motor 111 can be driven, an information transmission step is performed (S140).

In the information transmission step, first, the MCU of the integrated controller 300 determines the type of the operation signal (S141) and transmits the driving information of the driving motor 111 to the motor controller 112 on the basis of the determined operation signal.

When the operation signal is the manual operation signal, the MCU of the integrated controller 300 checks a driving direction of the power seat 100 input through the interface (S144) and transmits the driving information corresponding to the driving direction and a manual operation driving speed predetermined in the integrated controller 300 to the motor controller 112 of the control target driving motor 111. (S145) For example, the driving direction of the driving motor 111 may be a forward direction or a backward direction. The manual operation driving speed may be stored in a memory (not shown) of the integrated controller 300.

When the operation signal is an automatic operation signal, the MCU of the integrated controller 300 checks the driving information corresponding to an automatic operation driving speed predetermined in the integrated controller 300 and a Hall count value corresponding to the pre-stored target position (S143) and transmits the driving information to the motor controller 112 of the control target driving motor 111. (S145) The hall count value corresponding to the target position and the automatic operation driving speed may be stored in the memory of the integrated controller 300 as information corresponding to each driving motor 111.

Meanwhile, when the operation signal is the automatic operation signal, it is necessary to first determine whether the calibration of the driving motor 111 is completed before checking the Hall count value corresponding to the target position (S142). The calibration is, as described above, a process of learning a movable section of the driving motor 111 and of setting the movable section. The motor controller 112 of the driving motor 111 of which the calibration is completed transmits a calibration completion signal (Limit Set), the motor controller 112 of the driving motor 111 of which the calibration is not completed transmits a calibration incompletion signal (Limit Not Set) to the integrated controller 300. More specifically, the motor controller 112 performs the calibration by the calibration operation signal, and the motor controller 112 measures a total stroke distance by operating the driving motor 111 toward the frontmost portion and rearmost portion, and sets the movable section. When the motor controller 112 continues to move the driving motor 111 toward the frontmost portion, the power seat 100 reaches the front end to which the power seat 100 can move, and a hall sensor error occurs. Here, the motor controller 112 changes the driving direction of the driving motor 111 and continue to move the driving motor 111 toward the rearmost portion, and the power seat 100 reaches the rear end to which the power seat 100 can move, and the hall sensor error occurs. That is, the stroke distance of the driving motor 111 (or the power seat 100) may be set based on the Hall sensor count measured while operating the driving motor 111 from the front end to the rear end.

In summary, the driving information transmitted through the LIN communication in the information transmission step may include not only the information on the type of operation signal but also the information on the driving direction and the manual operation driving speed when the operation signal is the manual operation signal or the information on the driving speed and the Hall count value for the target position when the operation signal is the automatic operation signal.

Meanwhile, the integrated controller 300 may further include a step of receiving operation state information of the driving motor 111 from the motor controller 112 (S110). Here, the operation state information may include the error state signal which represents whether the driving motor 111 is drivable or not, the Hall sensor signal which represents current position information of the driving motor 111, and an operation direction signal including information on an immediately preceding operation direction of the driving motor 111. After the motor controller 112 receives the driving information from the integrated controller 300 and operates the control target driving motor 111, the operation state information may be transmitted from the motor controller 112 by the request of the integrated controller 300.

Figure 8A:
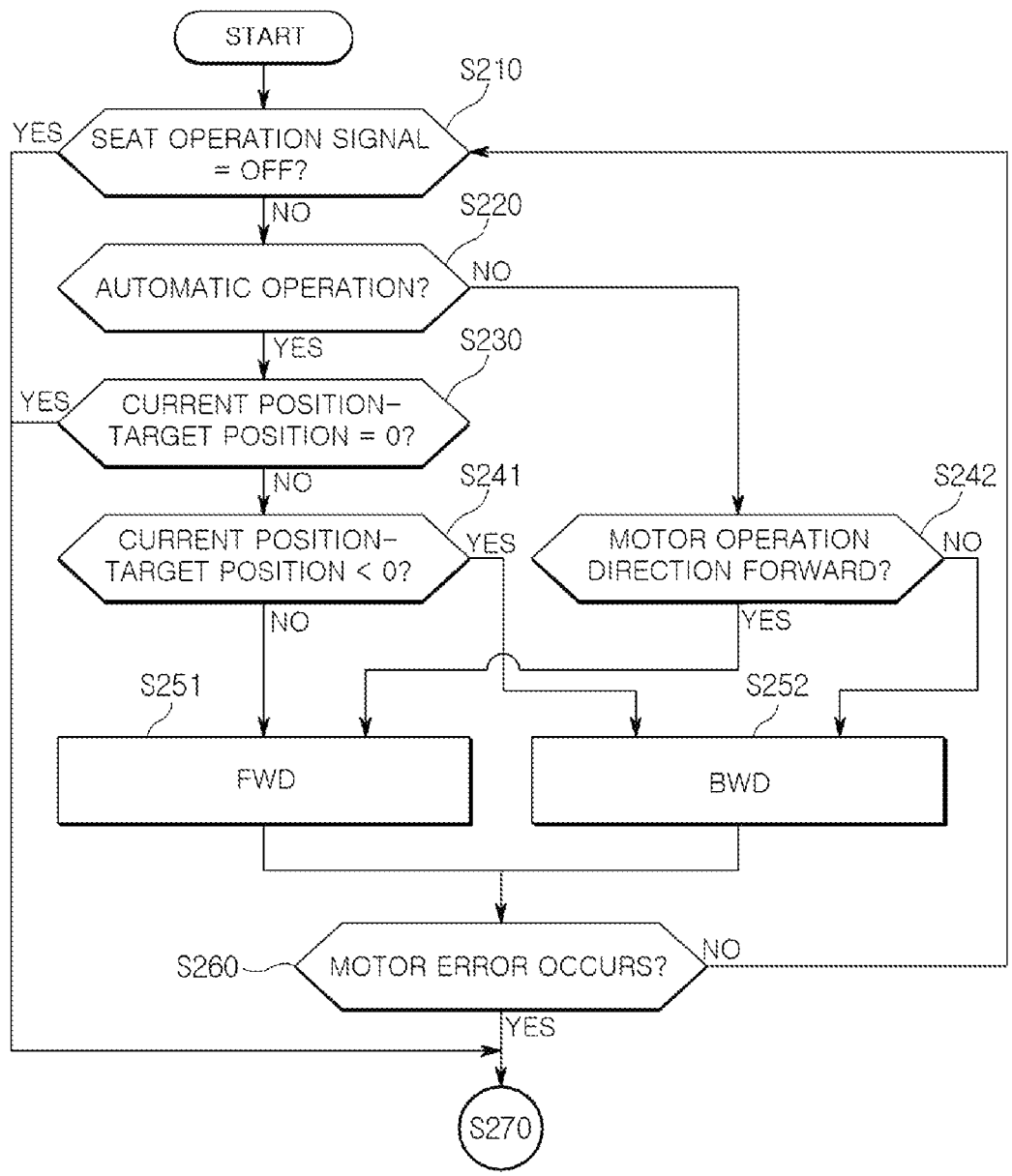
FIG. 8*a* and FIG. 8*b* are flowcharts showing an operation flow of the motor controller of FIG. 5 in the power seat integrated control method according to the embodiment of the present invention.
Figure 8B:
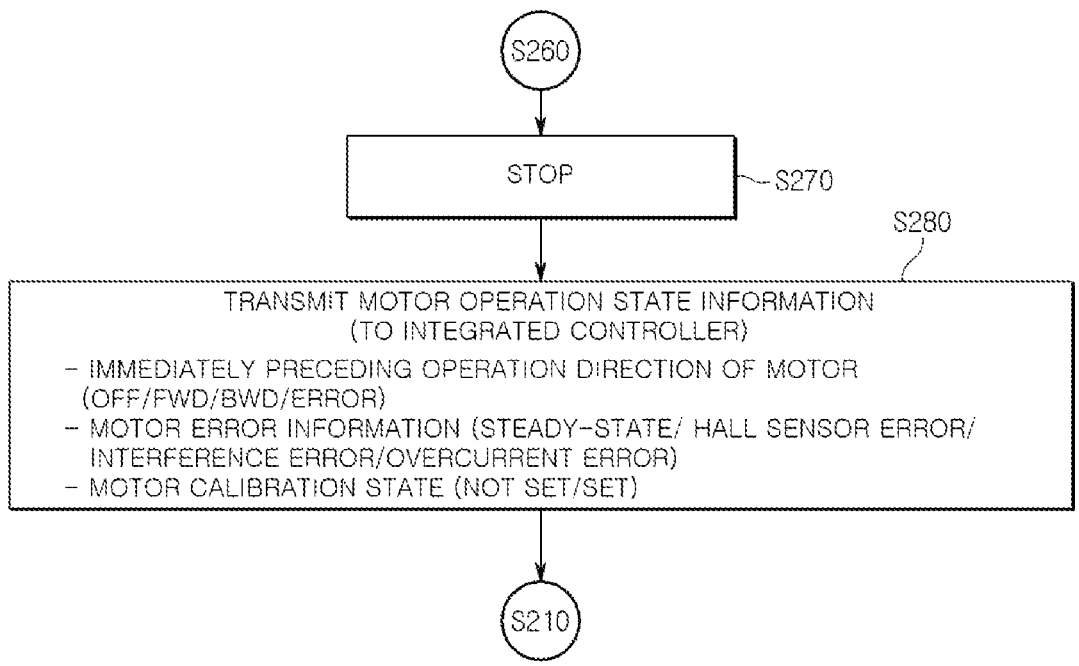

FIG. 8a and FIG. 8b are flowcharts showing an operation flow of the motor controller of FIG. 5 in the power seat integrated control method according to the embodiment of the present invention.

The motor controller 112 may control the driving motor 111 to operate based on the driving information received from the integrated controller 300.

First, the motor controller 112 receives the type of the operation signal from the integrated controller 300 and determines whether the received operation signal is a turn-off signal (S210). If the operation signal is a turn-off signal, the motor controller 112 does not have to control the driving motor 111 and returns to a standby state after stopping the driving motor 111 (S270). When the motor controller 112 receives the remaining operation signals (manual operation signal, automatic operation signal, and calibration operation signal) other than the signal at this time, the driving motor 111 must be operated to correspond to the operation signal. Therefore, the motor controller 112 performs the following step. Meanwhile, the standby state may mean a state where the motor controller 112 waits for the operation signal to be input from the integrated controller 300.

If the operation signal is not a turn-off signal, the motor controller 112 determines whether the operation signal is the automatic operation signal or not (S220). If the operation signal is the automatic operation signal, the motor controller 112 compares the target position and the current position of the driving motor 111 by using the Hall count value for the target position among the driving information transmitted by the integrated controller 300. The comparison between the current position and the target position may be performed by comparing the Hall counter value that is changed by rotation of the rotor of the driving motor 111 with the Hall counter value for the target position.

When the current position and the target position are the same, there is no need to control the driving motor 111, and therefore, the motor controller 112 returns to the standby state (S230 and S270). When the current position is greater than the target position, the motor controller 112 controls the driving motor 111 to drive forward (S241 and S251). When the current position is smaller than the target position, the motor controller 112 controls the driving motor 111 to drive backward (S241 and S252). On the other hand, the driving motor 111 may be controlled by the controller 1121 of the motor controller 112. The forward driving control may refer to forward rotation of the driving motor 111, and the backward driving control may refer to reverse rotation of the driving motor 111.

If the operation signal is not the automatic operation signal, that is, if the operation signal is the manual operation signal or the calibration operation signal, the driving motor 111 is controlled according to the driving direction and speed received from the integrated controller 300. That is, when the driving direction received from the integrated controller 300 is a forward direction, the driving motor 111 is controlled to drive forward (S242 and S251), and when the driving direction received from the integrated controller 300 is a backward direction, the driving motor 111 is controlled to drive backward (S242 and S252).

After controlling the driving motor 111 to drive forward or backward, the motor controller 112 determines whether an error occurs in the driving motor 111 (S260). As described above, the error in the driving motor 111 includes the Hall sensor error, the interference error, and the overcurrent error. When the motor controller 112 receives information on the above-described errors from the driving motor 111, the motor controller 112 generates a corresponding error state signal. Also, when the error state signal is generated, the motor controller 112 stops the driving motor 111 and returns to the standby state (S270). When the motor controller 112 does not receive the information on the above-described errors from the driving motor 111, the motor controller 112 generates the steady-state signal (Not Fail) as the error state signal.

The motor controller 112 transmits, to the integrated controller 300, a signal including at least one of the error state signal, the Hall sensor signal representing the current position information of the driving motor 111, and the operation direction signal including the information on the immediately preceding operation direction of the driving motor 111 (S280). Here, the above-described calibration completion signal of the driving motor 111 may be included. Here, the driving motor 111 is operated until the Hall sensor error occurs to the foremost portion and the rearmost portion, and then the calibration completion signal may be generated.

As such, according to the present invention, the driving information of the driving motor is stored in the integrated controller rather than the motor controller, and the integrated controller provides the driving information to the motor controller. The motor controller performs only the role of controlling the driving motor on the basis of the received driving information and the role of transmitting the information on the state such as the current position of the driving motor. Therefore, when it is necessary to change the software specification related to the operation of the power seat, it is only required to update only the integrated controller while leaving the motor module which is not easy to replace and update because it is coupled to the frame of the power seat. The specification can be easily changed at a low cost.

For example, if it is necessary to modify the set values of external conditions related to the operation of the power seat (on/off condition of an IGN signal, speed condition of the vehicle, applied battery voltage condition, etc.), the purpose can be achieved by changing the setting of the integrated controller alone regardless of the motor module.

Alternatively, for example, when it is necessary to modify the parameter set value of the control target driving motor, such as the moving speed of the power seat, etc., the purpose can be achieved by changing the setting of the integrated controller alone regardless of the motor module.

Although the present invention has been described with the confined embodiment and drawings, the present invention is not limited to the embodiment and various changes and modifications can be made from this disclosure by a skilled person in the art. Therefore, the spirit of the present invention is understood only by the claims, and any variations equivalent thereto are included in the spirit of the present invention.

REFERENCE NUMERALS

10: Conventional Power Seat
11: Conventional Higher-Level Controller
12: Conventional DC Motor
20: Battery
30: Main CAN Communication Bus of Vehicle
100: Power Seat
110: Motor Module
111: Driving Motor
112: Motor Controller
1121: Controller
1122: Inverter
1123: Power Supply Unit
1124: Gate Driver
1125: Motor Module Communication Unit
113: Connector
114: Hall Sensor
200: Communication Line
300: Integrated Controller
310: First Communication Unit
320: Second Communication Unit
400: Lin Communication Bus

What is claimed is:

1. A power seat integrated control method which is performed by one integrated controller connected to a plurality of power seats, the method comprising:
  a signal input step of receiving a power seat operation signal input that a user inputs through an interface of a vehicle;
  a determination step of determining an operating condition for operating a motor module that is built into the power seat and moves a specific area of the power seat, wherein the determination step comprises:
    a step of determining an external condition related to an operation of the power seat,
    a step of determining a control target driving motor on the basis of the operation signal,
    and a step of receiving an error state signal of the control target driving motor from the motor controller and determining whether the control target driving motor is drivable or not,
  wherein the step of determining an external condition
    determines whether an operating power condition, a starting condition, and a driving condition are all satisfied,
    determines that the operating power condition is satisfied when the integrated controller satisfies a minimum voltage for operating the power seat,
    determines that the starting condition is satisfied when both an IGN1 signal and an IGN2 signal of the vehicle are in an on-state or in an off-state or when the IGN1 signal is in an off-state and the IGN2 signal is in an on-state, and 'determines that the driving condition is satisfied when the vehicle is traveling at a speed less than a predetermined speed; and
  an information transmission step of transmitting driving information for controlling the motor module in accordance with a type of the operation signal,
  wherein the motor module comprises a driving motor and a motor controller which controls the driving motor, and one Local Interconnect Network (LIN1 communication bus is provided between the integrated controller and each power seat,
  wherein the motor controller is integrated into the motor module, the motor controller is equipped with a power supply unit, and the power supply unit is configured to apply power received from a battery to a Hall sensor,
  and wherein, in the information transmission step, the integrated controller transmits the driving information to the motor controller through the LIN communication bus.

2. The power seat integrated control method according to claim 1, wherein the step of determining whether the control target driving motor is drivable or not determines that it is impossible to operate the control target driving motor when the error state signal input from the motor controller of the control target driving motor is at least one of a Hall sensor error signal which represents a state where a Hall sensor signal is not input to the motor controller, an interference error signal which represents a state where the driving motor is no longer able to operate due to an interference with an external object while the control target driving motor operates, and an overcurrent error signal which represents a state an overcurrent flows through the control target driving motor, and
  determines an infeasible state by assessing the possibility of physical interference between the non-controlled power seat and the controlled power seat based on the Hall sensor signals input from the motor controller of the non-controlled drive motor and the motor controller of the controlled drive motor, in the absence of an error signal input from the motor controller of the controlled drive motor.

3. The power seat integrated control method according to claim 1,
  wherein, when the operation signal is a manual operation signal for allowing a user to move directly the power seat to a position that the user desires, the information transmission step is to check a driving direction of the power seat input through the interface and transmit driving information corresponding to the input driving direction and a manual operation driving speed to the motor controller of a control target driving motor, wherein the manual operation driving speed is predetermined in the integrated controller,
  and wherein, when the operation signal is an automatic operation signal for moving the power seat to a pre-stored target position, the information transmission step is to check driving information corresponding to an automatic operation driving speed predetermined in the integrated controller and a hall count value corresponding to the pre-stored target position and transmit the hall count value and the driving information to the motor controller of the control target driving motor.

4. The power seat integrated control method according to claim 3, wherein, when the operation signal is the automatic operation signal for moving the power seat to the pre-stored target position, the information transmission step is to determine from the motor controller of the control target driving motor whether motor calibration which learns a distance that the power seat is able to move to the maximum forward and backward is completed or not.

5. The power seat integrated control method according to claim 1, further comprising a step of receiving operation state information of the driving motor from the motor controller before the signal input step, wherein the operation state information comprises an error state signal which represents whether the driving motor is drivable or not, a Hall sensor signal which represents current position information of the driving motor, and an operation direction signal which comprises information on an immediately preceding operation direction of the driving motor.

\* \* \* \* \*